US012586989B2

(12) United States Patent
Hata et al.

(10) Patent No.: US 12,586,989 B2
(45) Date of Patent: Mar. 24, 2026

(54) DISCHARGE DEVICE

(71) Applicant: Panasonic Intellectual Property Management Co., Ltd., Osaka (JP)

(72) Inventors: Hidetoshi Hata, Osaka (JP); Yohei Ishigami, Osaka (JP); Makoto Imai, Shiga (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 180 days.

(21) Appl. No.: 18/575,880

(22) PCT Filed: Apr. 21, 2022

(86) PCT No.: PCT/JP2022/018465
§ 371 (c)(1),
(2) Date: Jan. 1, 2024

(87) PCT Pub. No.: WO2023/007884
PCT Pub. Date: Feb. 2, 2023

(65) Prior Publication Data

US 2024/0322530 A1 Sep. 26, 2024

(30) Foreign Application Priority Data

Jul. 30, 2021 (JP) ................................ 2021-125194

(51) Int. Cl.
*H01T 19/00* (2006.01)

(52) U.S. Cl.
CPC .................................... *H01T 19/00* (2013.01)

(58) Field of Classification Search
CPC ....... B05B 5/053; B05B 5/0255; B05B 5/057; H01T 19/00; H01T 19/04; H01T 23/00
(Continued)

(56) References Cited

U.S. PATENT DOCUMENTS

2018/0034248 A1 2/2018 Ishigami et al.
2022/0344912 A1 10/2022 Ishigami et al.

FOREIGN PATENT DOCUMENTS

JP 2009-216286 9/2009
JP 2009216286 A * 9/2009
(Continued)

OTHER PUBLICATIONS

Machine translation of Takahashi et al. Japanese Patent Document JP 2009-216286 A Sep. 2009 (Year: 2009).*
(Continued)

*Primary Examiner* — Kevin J Comber
(74) *Attorney, Agent, or Firm* — Rimon P.C.

(57) ABSTRACT

A discharge device includes discharge electrode, counter electrode, and a voltage application device. Discharge electrode includes distal end portion. Counter electrode is disposed so as to face distal end portion of discharge electrode with a gap provided therebetween. The voltage application device applies a voltage between discharge electrode and counter electrode to generate a discharge between discharge electrode and counter electrode. Discharge electrode protrudes toward counter electrode. Counter electrode includes discharge portion where a discharge occurs between discharge portion and distal end portion of discharge electrode. Discharge portion extends along a circumference centered at distal end portion of discharge electrode.

9 Claims, 6 Drawing Sheets

(58) Field of Classification Search
USPC .......................................................... 361/230
See application file for complete search history.

(56) References Cited

FOREIGN PATENT DOCUMENTS

| | | |
|---|---|---|
| JP | 2018-022574 | 2/2018 |
| WO | 2010/021332 | 2/2010 |
| WO | 2021/059688 A1 | 4/2021 |

OTHER PUBLICATIONS

The EPC Office Action dated Oct. 22, 2024 for the related European Patent Application No. 22848967.0.
International Search Report of PCT application No. PCT/JP2022/018465 dated Jul. 5, 2022.

* cited by examiner

DISCHARGE DEVICE

CROSS-REFERENCE TO RELATED APPLICATIONS

This application is a U.S. national stage application of the PCT International Application No. PCT/JP2022/018465 filed on Apr. 21, 2022, which claims the benefit of foreign priority of Japanese patent application No. 2021-125194 filed on Jul. 30, 2021, the contents all of which are incorporated herein by reference.

TECHNICAL FIELD

The present disclosure relates generally to a discharge device, and more particularly to a discharge device including a discharge electrode and a counter electrode.

BACKGROUND ART

PTL 1 describes a discharge device including a discharge electrode, a counter electrode, and a voltage application unit. The counter electrode is located so as to face the discharge electrode. The voltage application unit applies a voltage to the discharge electrode to generate a discharge having higher energy than a corona discharge in the discharge electrode. The discharge having higher energy in the discharge device described in PTL 1 is discharge that spasmodically generates a discharge path in which dielectric breakdown occurs between the discharge electrode and the counter electrode so as to connect the discharge electrode and the counter electrode.

Moreover, in the discharge device described in PTL 1, liquid is supplied to the discharge electrode by a liquid supply unit. Therefore, the liquid is electrostatically atomized by the discharge, and nanometer-sized charged fine particle liquid containing radicals inside is generated.

In the discharge mode in the discharge device described in PTL 1, since active components (radicals or charged fine particle liquid containing the radicals) are generated with higher energy than the corona discharge, a larger amount of active components is generated as compared with the corona discharge. Furthermore, the amount of ozone generated is suppressed to the same extent as in the case of the corona discharge.

CITATION LIST

Patent Literature

PTL 1: Unexamined Japanese Patent Publication No. 2018-22574

SUMMARY OF THE INVENTION

In the discharge device described in PTL 1, it is desired to further increase the generation amount of active components by a discharge.

The present disclosure has been made in view of the above circumstances, and an object of the present disclosure is to provide a discharge device capable of increasing a generation amount of active components.

An electric discharge device according to one aspect of the present disclosure includes a discharge electrode, a counter electrode, and a voltage application device. The discharge electrode includes a distal end portion. The counter electrode is disposed so as to face the distal end portion of the discharge electrode with a gap provided between the counter electrode and the distal end portion. The voltage application device generates a discharge between the discharge electrode and the counter electrode by applying a voltage between the discharge electrode and the counter electrode. The discharge electrode protrudes toward the counter electrode. The counter electrode includes a discharge portion where the discharge occurs between the discharge portion and the distal end portion of the discharge electrode. The discharge portion extends along a circumference centered at the distal end portion of the discharge electrode.

According to the discharge device of the above aspect of the present disclosure, it is possible to increase the generation amount of active components.

DESCRIPTION OF EMBODIMENT

Figure 1:
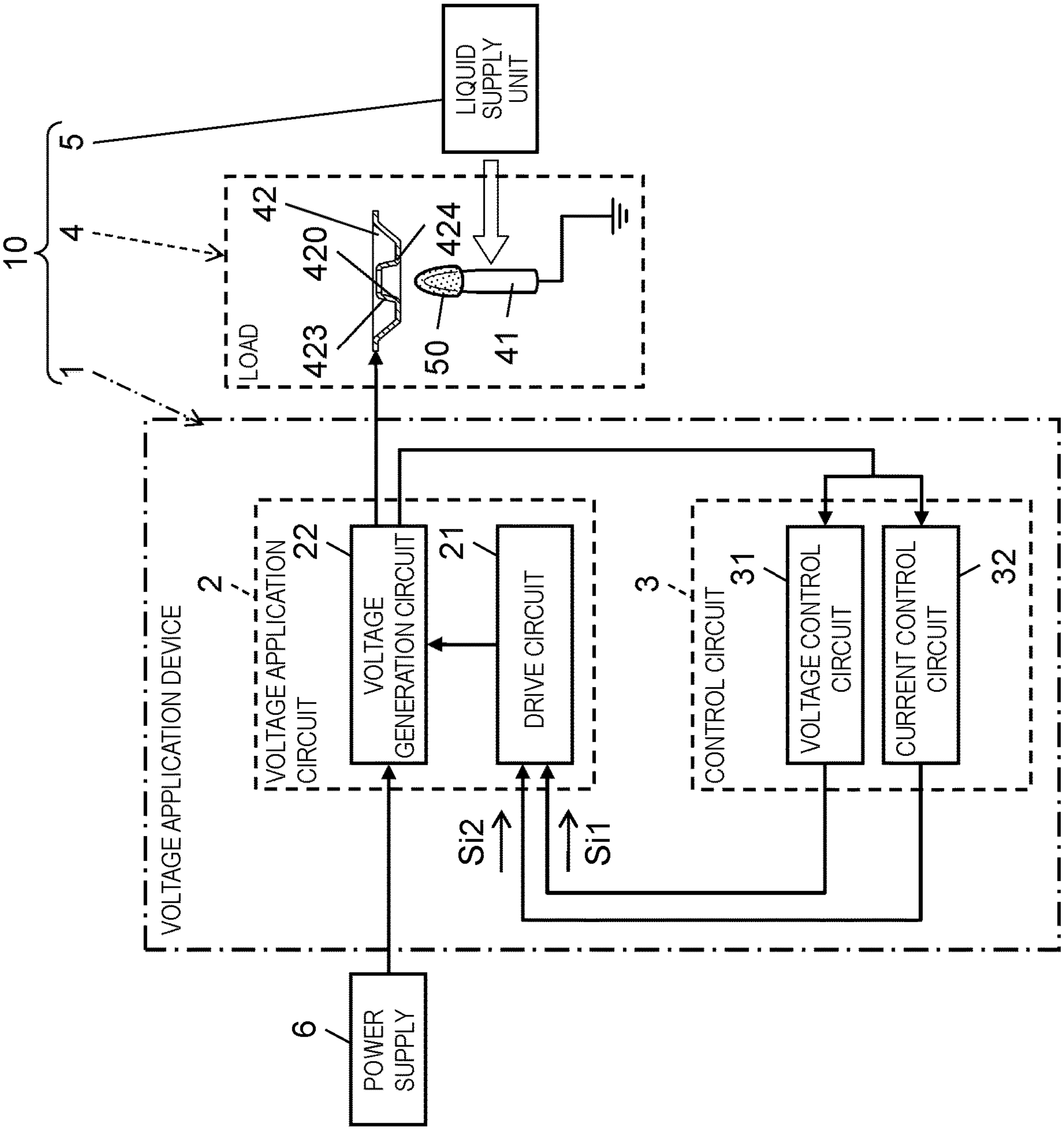
FIG. 1 is a block diagram illustrating a discharge device according to an exemplary embodiment.

Hereinafter, a preferred exemplary embodiment of the present disclosure will be described in detail with reference to the drawings. Note that, in the exemplary embodiment described below, elements common to each other are denoted by the same reference numerals, and redundant description of the common elements may be omitted. The following exemplary embodiment is merely one of various exemplary embodiments of the present disclosure. The exemplary embodiment can be variously changed according to the design and the like as long as the object of the present disclosure can be achieved. Each drawing described in the present disclosure is a schematic view, and a ratio of a size and a thickness of each component in each drawing does not necessarily reflect an actual dimensional ratio. The arrows indicating the respective directions in the drawings are merely examples, and are not intended to define directions of a discharge device 10 at the time of use. In addition, the arrows indicating the respective directions in the drawings are merely shown for the sake of description, and are not accompanied by entities.

(1) Overview

Figure 2A:
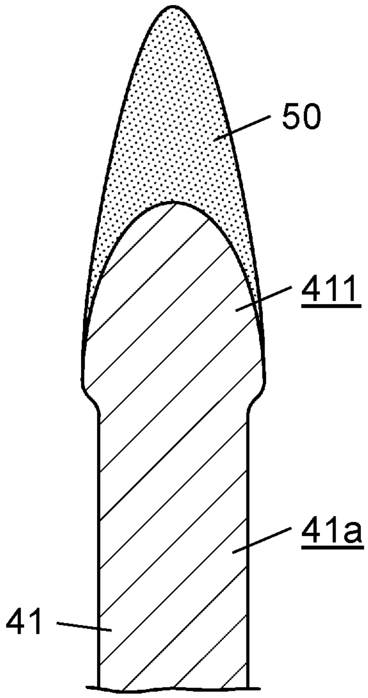
FIG. 2A is a schematic view illustrating a state in which liquid held by a discharge electrode in the discharge device is extended.
Figure 2B:
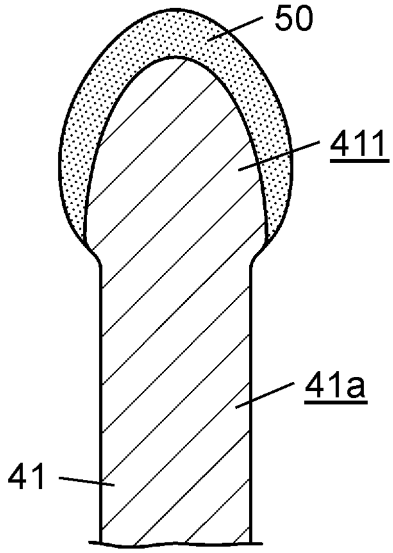
FIG. 2B is a schematic view illustrating a state in which the liquid held by the discharge electrode is contracted.
Figure 3A:
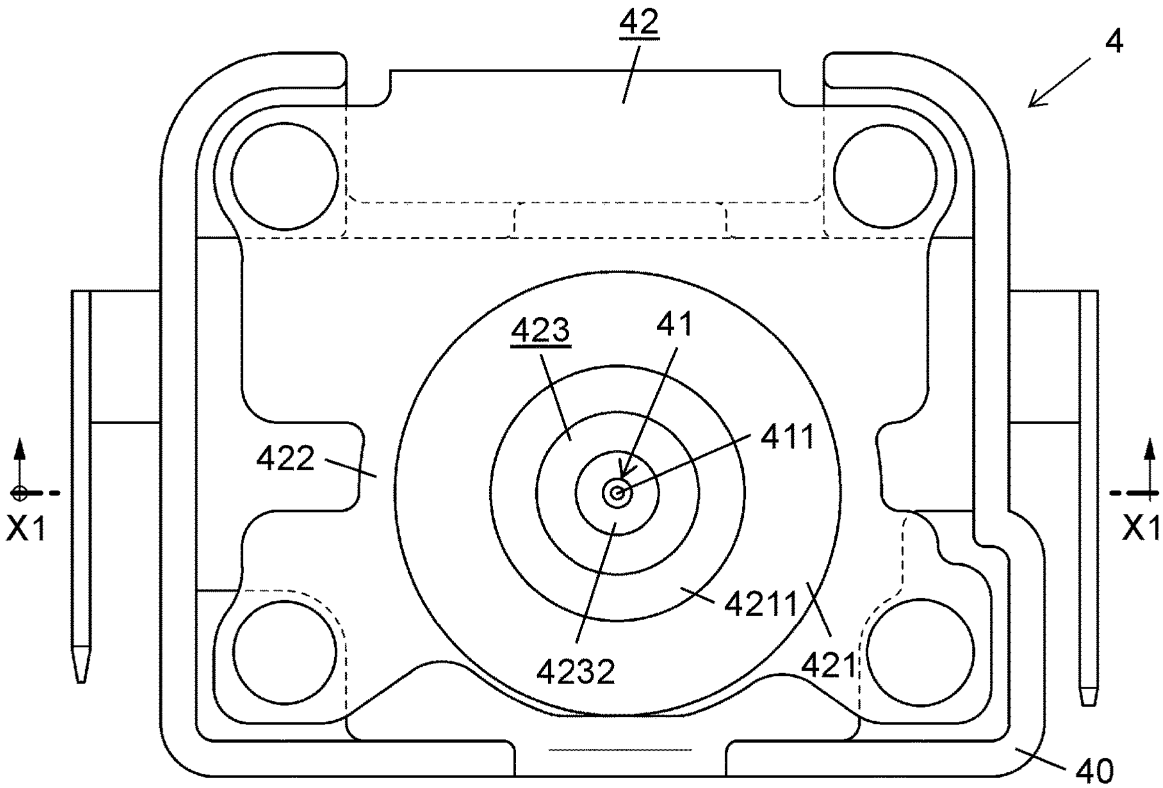
FIG. 3A is a top view illustrating a load in the discharge device.
Figure 3B:
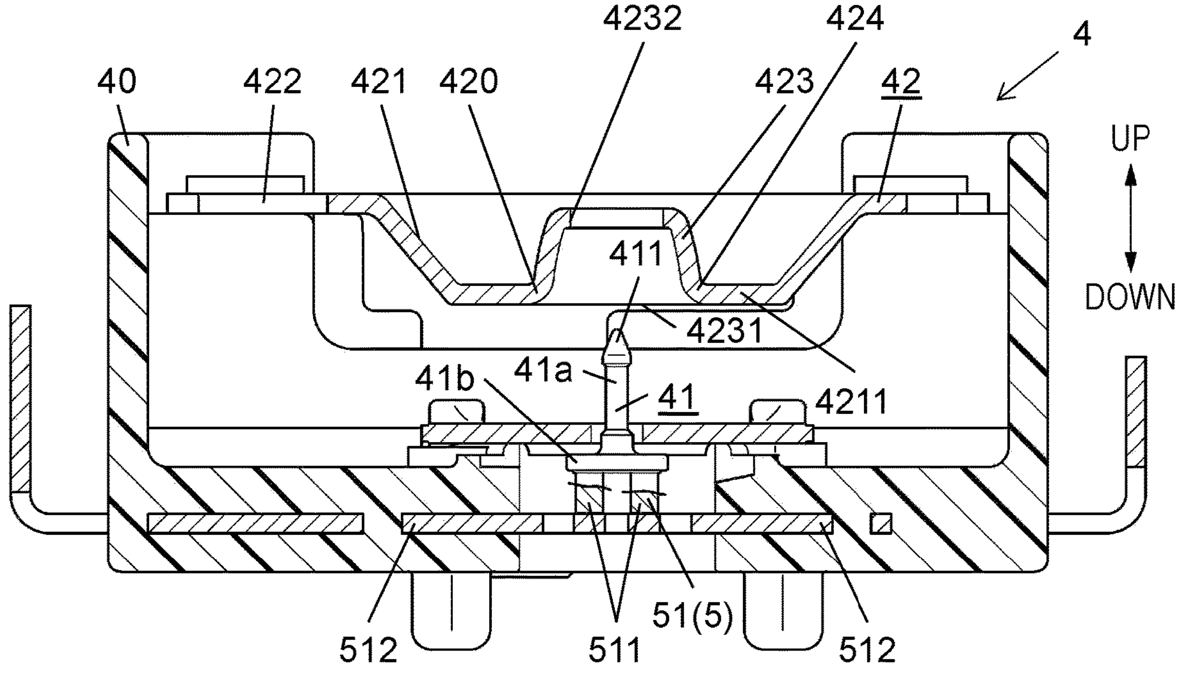
FIG. 3B is a cross-sectional view taken along line X1-X1 of FIG. 3A.
Figure 4A:
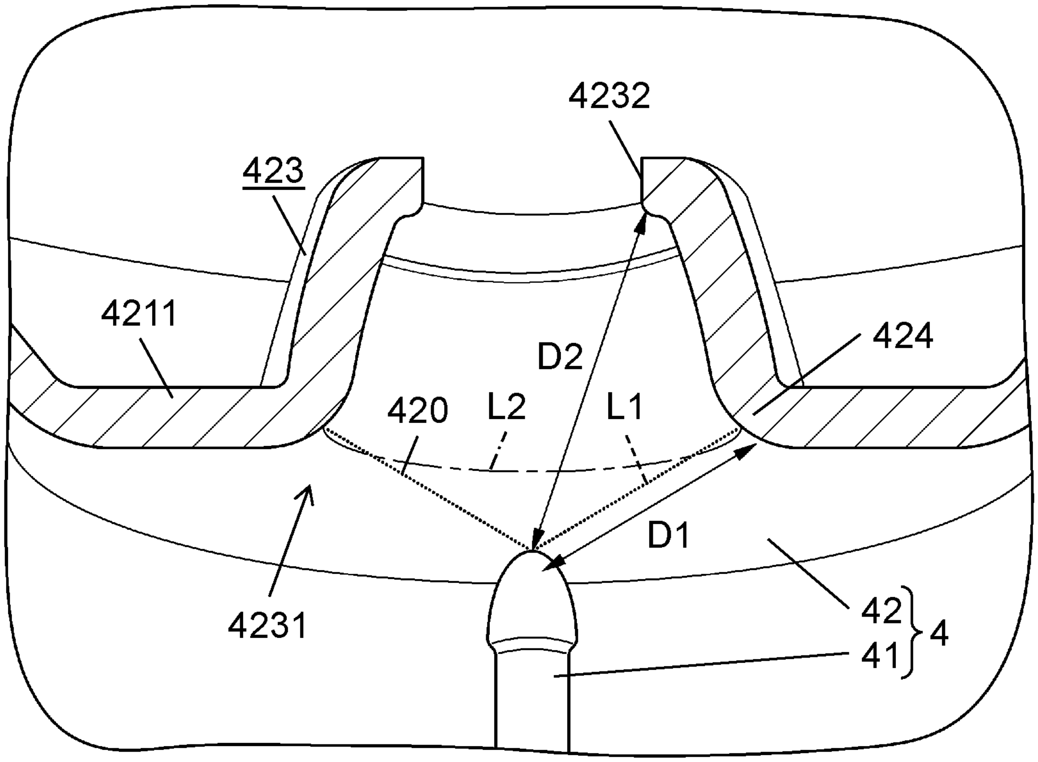
FIG. 4A is a schematic view in which a main part of the load is partially broken.

First, an outline of discharge device 10 according to the present exemplary embodiment will be described with reference to FIGS. 1 to 4A. FIG. 1 is a block diagram illustrating discharge device 10 according to the exemplary embodiment. FIG. 2A is a schematic view illustrating a state in which liquid held by discharge electrode 41 in discharge device 10 is extended. FIG. 2B is a schematic view illustrating a state in which the liquid held by discharge electrode 41 is contracted. FIG. 3A is a top view illustrating load 4 in discharge device 10. FIG. 3B is a cross-sectional view taken along line X1-X1 of FIG. 3A. FIG. 4A is a schematic view in which a main part of load 4 is partially broken.

As illustrated in FIG. 1, discharge device 10 according to the present exemplary embodiment further includes voltage application device 1, load 4 (electrode device), and liquid supply unit 5.

As illustrated in FIG. 3B, load 4 includes discharge electrode 41 and counter electrode 42. Load 4 is a device that generates a discharge between discharge electrode 41 and counter electrode 42 by applying a voltage between discharge electrode 41 and counter electrode 42. In the following description, a direction in which discharge electrode 41 and counter electrode 42 face each other is defined as a vertical direction. A direction from discharge electrode 41 to counter electrode 42 is defined as upward, and a direction from counter electrode 42 to discharge electrode 41 is defined as downward.

Discharge electrode 41 protrudes (upward) toward counter electrode 42. Discharge electrode 41 includes distal end portion 411 (see FIG. 2A). Distal end portion 411 is formed at a distal end (upper end) of discharge electrode 41 in a direction in which discharge electrode 41 protrudes. Distal end portion 411 holds liquid 50 (see FIG. 2A). In the following description, a direction in which discharge electrode 41 protrudes (upward) may be referred to as a "protruding direction of discharge electrode 41".

Counter electrode 42 is disposed so as to face distal end portion 411 of discharge electrode 41 with a gap provided therebetween. Counter electrode 42 includes discharge portion 420 where a discharge occurs between discharge portion 420 and distal end portion 411 of discharge electrode 41. Discharge portion 420 extends along a circumference centered at distal end portion 411 of discharge electrode 41. In other words, discharge portion 420 extends linearly along the circumference centered at distal end portion 411 of discharge electrode 41 in plan view as viewed from the axial direction of discharge electrode 41.

Liquid supply unit 5 supplies liquid 50 to distal end portion 411 of discharge electrode 41.

Voltage application device 1 is a device that generates a discharge between discharge electrode 41 and counter electrode 42 by applying a voltage between discharge electrode 41 and counter electrode 42. In other words, voltage application device 1 applies a voltage between discharge electrode 41 and counter electrode 42 to form discharge path L1 (see FIG. 4A) in which dielectric breakdown partially occurs between distal end portion 411 of discharge electrode 41 and counter electrode 42. The term "dielectric breakdown" in the present disclosure means that electrical insulation of an insulator (including a gas) that isolates conductors from each other is broken, and an insulation state cannot be maintained. The dielectric breakdown of the gas occurs, for example, because ionized molecules are accelerated by an electric field, collide with other gas molecules, and ionize, and an ion concentration rapidly increases to generate gas discharge.

Voltage application device 1 of the present exemplary embodiment applies a voltage from voltage application circuit 2 to load 4 including discharge electrode 41 in a state where liquid 50 is held on discharge electrode 41. In this manner, a discharge is generated at least in discharge electrode 41, and liquid 50 held in discharge electrode 41 is electrostatically atomized by the discharge.

Discharge device 10 generates radicals by generating a discharge between discharge electrode 41 and counter electrode 42 of load 4, and electrostatically atomizes liquid 50 held by discharge electrode 41. In other words, discharge device 10 generates a nanometer-sized charged fine particle liquid containing radicals in the microdroplets of electrostatically atomized liquid 50. That is, discharge device 10 functions as a charged fine particle liquid generation device (electrostatic atomization device). The radicals are the basis for providing useful effects in various situations, besides sterile filtration, odor removal, moisture keeping, freshness keeping, and inactivation of viruses. Hereinafter, radicals, charged fine particle liquids, and the like may be collectively referred to as active components. The active components also include air ions.

By generating the charged fine particle liquid containing radicals, discharge device 10 can prolong the life of the radicals as compared with the case where the radicals alone are released into the air. Moreover, when the charged fine particle liquid has a nanometer size, for example, the charged fine particle liquid can be suspended in a relatively wide range.

As described above, counter electrode 42 of discharge device 10 of the present exemplary embodiment includes discharge portion 420. Discharge portion 420 is a portion that generates a discharge with distal end portion 411 of discharge electrode 41. As described above, since discharge portion 420 extends linearly along the circumference centered at distal end portion 411 of discharge electrode 41, discharge path L1 having an apex at distal end portion 411 of discharge electrode 41 is extended as compared with a conventional load (counter electrode) including a discharge portion formed in a needle shape. As discharge path L1 extends, it is possible to increase the generation amount of active components (including radicals and the like) generated by the discharge.

(2) Details

Figure 4B:
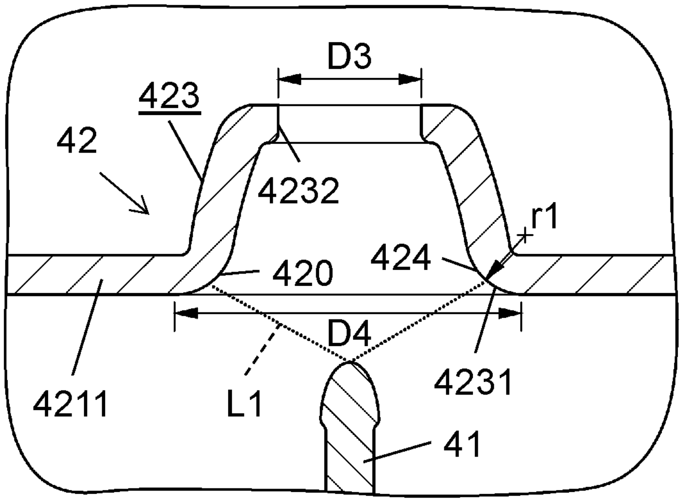
FIG. 4B is a cross-sectional view of the main part of the load.
Figure 4C:
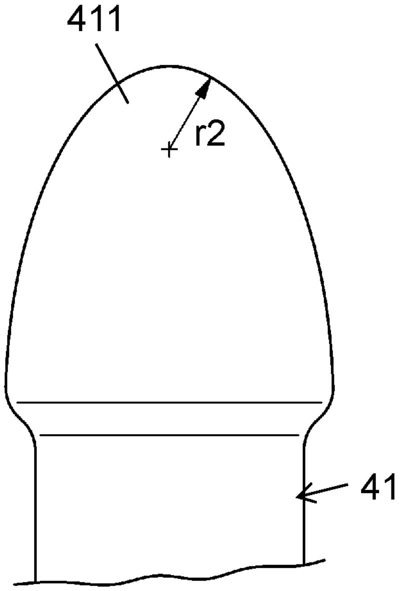
FIG. 4C is a front view of the discharge electrode.
Figures 5A, 5B, 5C:
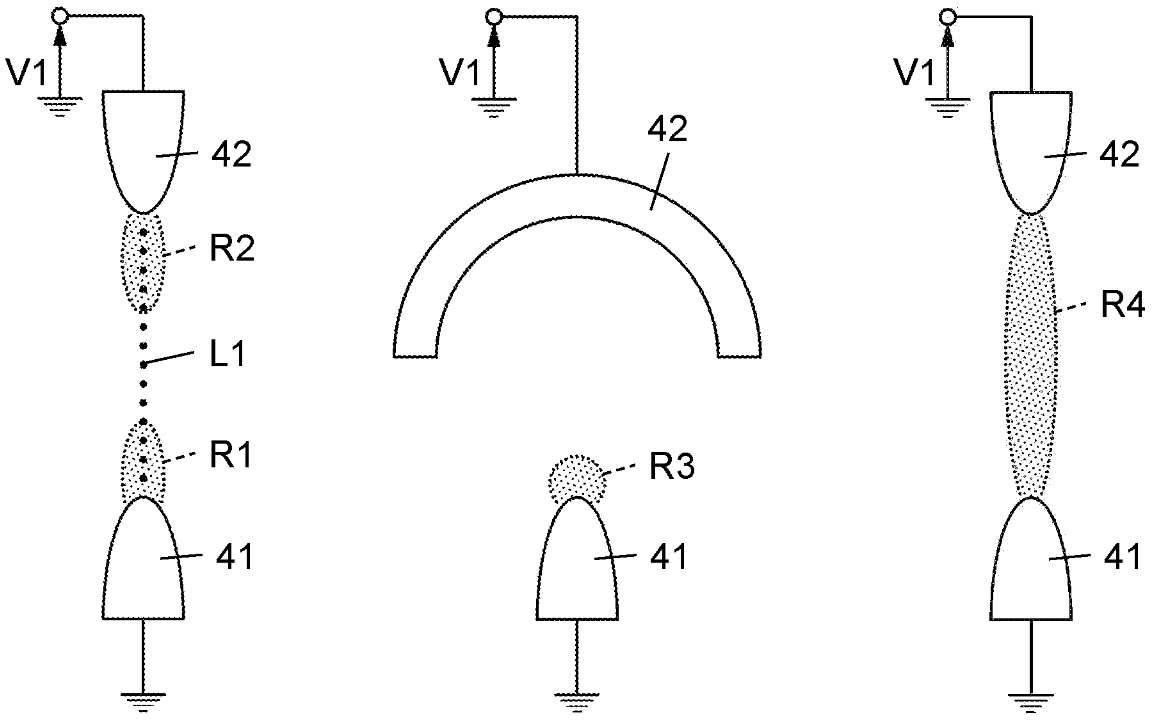
FIG. 5A is a schematic view illustrating a discharge mode of a partial breakdown discharge.
FIG. 5B is a schematic view illustrating a discharge mode of a corona discharge.
FIG. 5C is a schematic view illustrating a discharge mode of a full path breakdown discharge.

Hereinafter, discharge device 10 according to the present exemplary embodiment will be described with reference to FIGS. 1 to 5C. FIG. 4B is a cross-sectional view of a main part of load 4 in discharge device 41. FIG. 4C is a front view of discharge electrode 10 in discharge device 10. FIG. 5A is a schematic view illustrating a discharge mode of a partial breakdown discharge. FIG. 5B is a schematic view illustrating a discharge mode of a corona discharge. FIG. 5C is a schematic view illustrating a discharge mode of a full path breakdown discharge.

(2.1) Configuration of Discharge Device

As illustrated in FIG. 1, discharge device 10 according to the present exemplary embodiment includes voltage application device 1, load 4, and liquid supply unit 5.

(2.2) Configuration of Liquid Supply Unit

Liquid supply unit 5 supplies liquid 50 for electrostatic atomization to discharge electrode 41. As an example, liquid supply unit 5 is achieved by using cooling device 51 illustrated in FIG. 3B. Cooling device 51 cools discharge electrode 41 to generate dew condensation water as liquid 50 (see FIG. 2A) at discharge electrode 41. Specifically, cooling device 51 includes a pair of Peltier elements 511 and a pair of heat dissipation plates 512. The pair of Peltier elements 511 are held by the pair of heat dissipation plates 512. Cooling device 51 cools discharge electrode 41 by conducting the pair of Peltier elements 511. A part of each of the pair of heat dissipation plates 512 is embedded in housing 40, which will be described later, of load 4, whereby the pair of heat dissipation plates 512 are held by housing 40. At least a portion holding Peltier element 511 in each of the pair of heat dissipation plates 512 is exposed from housing 40.

The pair of Peltier elements 511 is mechanically and electrically connected to base end portion 41*b*, which will be described later, of discharge electrode 41 by, for example, soldering. In addition, the pair of Peltier elements 511 are mechanically and electrically connected to the pair of heat dissipation plates 512 by, for example, soldering. Energization of the pair of Peltier elements 511 is performed through the pair of heat dissipation plates 512 and discharge electrode 41. Therefore, cooling device 51 constituting liquid supply unit 5 cools the entire of discharge electrode 41 through base end portion 41*b*. Accordingly, moisture in the air condenses and adheres to the surface of discharge electrode 41 as dew condensation water. This dew condensation water is held as liquid 50 by discharge electrode 41. That is, liquid supply unit 5 is configured to cool discharge electrode 41, and generate dew condensation water as liquid 50 on the surface of discharge electrode 41. In this configuration, since liquid supply unit 5 can supply liquid 50 (dew condensation water) to discharge electrode 41 by using moisture in the air, it is unnecessary to supply and replenish the liquid to discharge device 10.

(2.3) Configuration of Voltage Application Device

As illustrated in FIG. 1, voltage application device 1 of the present exemplary embodiment includes voltage application circuit 2 and control circuit 3.

Voltage application circuit 2 includes drive circuit 21 and voltage generation circuit 22. Drive circuit 21 is a circuit that drives voltage generation circuit 22. Voltage generation circuit 22 is a circuit that receives power supply from power supply 6 (input unit) and generates applied voltage V1 (see FIG. 5A) to be applied to load 4. The "applied voltage" in the present disclosure refers to a voltage applied to load 4 by voltage application circuit 2 to generate a discharge. Power supply 6 is a power supply circuit that generates a DC voltage of about several V to several tens of V. In the present exemplary embodiment, it is assumed that power supply 6 is not included in the components of voltage application device 1. However, power supply 6 may be included in the components of voltage application device 1.

Voltage application circuit 2 is, for example, an isolated DC/DC converter, boosts an input voltage (for example, 13.8 V) from power supply 6, and outputs the boosted voltage as applied voltage V1. Applied voltage V1 of voltage application circuit 2 is applied to load 4 (discharge electrode 41 and counter electrode 42).

Voltage application circuit 2 is electrically connected to load 4. Voltage application circuit 2 applies a high voltage to load 4. Voltage application circuit 2 herein is configured to apply a high voltage between discharge electrode 41 and counter electrode 42 while setting discharge electrode 41 as a negative electrode (ground) and counter electrode 42 as a positive electrode (plus). In other words, in a state where a high voltage is applied from voltage application circuit 2 to load 4, a potential difference is generated between discharge electrode 41 and counter electrode 42 in such a way that the potential on counter electrode 42 is a high potential and the potential on discharge electrode 41 is a low potential. The term "high voltage" as used herein may be a voltage set to generate a discharge between discharge electrode 41 and counter electrode 42.

As illustrated in FIG. 5A, the "discharge between discharge electrode 41 and counter electrode 42" in the present disclosure includes a discharge in which discharge path L1 in which dielectric breakdown partially occurs is formed between discharge electrode 41 and counter electrode 42. The discharge in a mode where the discharge path L1 in which dielectric breakdown partially occurs is formed as described above will be hereinafter referred to as a "partial breakdown discharge". In other words, in the partial breakdown discharge, discharge path L1 in which dielectric breakdown partially occurs is formed between discharge electrode 41 and counter electrode 42 (between the pair of electrodes). The partial breakdown discharge will be described in detail in the section of "(3) Discharge mode".

As illustrated in FIG. 5C, the "discharge between discharge electrode 41 and counter electrode 42" in the present disclosure includes a discharge in which dielectric breakdown region R4 in which dielectric breakdown occurs as a whole is formed between discharge electrode 41 and counter electrode 42. The discharge in a mode where dielectric breakdown region R4 in which dielectric breakdown occurs as a whole is formed as described above will be hereinafter referred to as a "full path breakdown discharge". In other words, in the full path breakdown discharge, a discharge path in which continuous dielectric breakdown occurs (a discharge path in which dielectric breakdown continuously occurs from one electrode to the other electrode) between discharge electrode 41 and counter electrode 42 (between the pair of electrodes) is formed. The full path breakdown discharge will be described in detail in the section of "(3) Discharge mode".

Voltage application circuit 2 of the present exemplary embodiment generates a discharge intermittently (spasmodically) by periodically changing the magnitude of applied voltage V1. Applied voltage V1 alternately repeats a period in which applied voltage V1 increases to become a high voltage and a period in which applied voltage V1 decreases to become a low voltage. As illustrated in FIGS. 2A and 2B, the magnitude of applied voltage V1 periodically changes, so that vibration occurs in liquid 50. Note that the "high voltage" as used herein may be any voltage set to generate a discharge in discharge electrode 41, such as a voltage having a peak of approximately 7.0 kV. However, the voltage value of applied voltage V1 is not limited to about 7.0 kV, and is appropriately set depending on, for example, the shapes of discharge electrode 41 and counter electrode 42, the distance between discharge electrode 41 and counter electrode 42, or the like. The "low voltage" may be a voltage set so that a discharge does not occur in discharge electrode 41, and is a voltage lower than the "high voltage", which has been described above. Hereinafter, "the magnitude of applied voltage V1 periodically changes" may be referred to as "applied voltage V1 periodically changes".

Specifically, in a period in which applied voltage V1 becomes a high voltage when applied voltage V1 is applied to load 4, liquid 50 held by discharge electrode 41 is subjected to a force caused by an electric field to form a conical shape called as a Taylor cone as illustrated in FIG.

2A. At least a part of distal end portion 411 of discharge electrode 41 enters liquid 50 having a Taylor cone shape. The electric field is concentrated on a distal end portion (an apex) of the Taylor cone, so that a discharge is generated. At this time, as the distal end portion of the Taylor cone becomes sharper, that is, as an apex angle of the cone becomes smaller (an acute angle), an electric field intensity required for dielectric breakdown becomes smaller, and a discharge is easily generated.

In addition, in a period in which applied voltage V1 becomes low, as illustrated in FIG. 2B, liquid 50 held by discharge electrode 41 has a substantially spherical shape due to a decrease in the force caused by the electric field.

When applied voltage V1 periodically changes, liquid 50 held by discharge electrode 41 deforms alternately into a shape illustrated in FIG. 2A and a shape illustrated in FIG. 2B. As a result, the Taylor cone as described above is formed periodically. Accordingly, a discharge is intermittently generated at the timing of formation of the Taylor cone as illustrated in FIG. 2A. Note that, in FIG. 2A and FIG. 2B, dot hatching is applied to liquid 50 so that distal end portion 411 and liquid 50 can be easily distinguished.

In the present disclosure, the discharge intermittently (spasmodically) generated between discharge electrode 41 and counter electrode 42 depending on the periodic change of applied voltage V1 may be referred to as a “leader discharge”. In the leader discharge, a discharge path is intermittently formed between discharge electrode 41 and counter electrode 42 (between a pair of electrodes), and a discharge current (output current) is intermittently and repeatedly generated. That is, the “leader discharge” includes a partial breakdown discharge and a full path breakdown discharge intermittently (spasmodically) generated between discharge electrode 41 and counter electrode 42 depending on a periodic change of applied voltage V1. The leader discharge is different from a spark discharge instantaneously (singly) generated between discharge electrode 41 and counter electrode 42. The leader discharge is also different from a glow discharge and an arc discharge continuously generated between discharge electrode 41 and counter electrode 42.

Control circuit 3 controls voltage application circuit 2. Control circuit 3 performs control to periodically change the magnitude of applied voltage V1 during a driving period in which voltage application device 1 is driven. The “drive period” in the present disclosure is a period in which voltage application device 1 is driven so as to generate a discharge in discharge electrode 41.

Control circuit 3 of the present exemplary embodiment controls voltage application circuit 2 based on a monitoring target. The “monitoring target” as used herein is constituted by at least either the output current or the output voltage of voltage application circuit 2. Control circuit 3 of the present exemplary embodiment includes voltage control circuit 31 and current control circuit 32.

Voltage control circuit 31 controls drive circuit 21 of voltage application circuit 2 based on the monitoring target including the output voltage of voltage application circuit 2. Voltage control circuit 31 outputs control signal Si1 to drive circuit 21, and controls drive circuit 21 by control signal Si1.

Current control circuit 32 controls drive circuit 21 of voltage application circuit 2 based on the monitoring target including the output current of voltage application circuit 2. Current control circuit 32 outputs control signal Si2 to drive circuit 21, and controls drive circuit 21 by control signal Si2.

Since there is a correlation between the output voltage (secondary voltage) of voltage application circuit 2 and the primary voltage of voltage application circuit 2, voltage control circuit 31 may indirectly detect the output voltage of voltage application circuit 2 from the primary voltage of voltage application circuit 2. Similarly, there is a correlation between the output current (secondary current) of voltage application circuit 2 and the input current (primary current) of voltage application circuit 2. Accordingly, current control circuit 32 may indirectly detect the output current of voltage application circuit 2 from the input current of voltage application circuit 2.

(2.4) Configuration of Load

As illustrated in FIG. 3B, load 4 of the present exemplary embodiment includes housing 40, discharge electrode 41, and counter electrode 42.

(2.4.1) Configuration of Housing

As illustrated in FIG. 3B, housing 40 is formed in a rectangular box shape in such a way that an upper surface (a surface on a side holding counter electrode 42) is an opening. Housing 40 is formed of an electrically insulating member such as synthetic resin. Housing 40 holds discharge electrode 41 and counter electrode 42. More specifically, housing 40 holds discharge electrode 41 and counter electrode 42 such that discharge electrode 41 and counter electrode 42 face each other with a gap provided therebetween in the vertical direction.

(2.4.2) Configuration of Discharge Electrode

As illustrated in FIG. 3B, discharge electrode 41 is a rod-shaped electrode. In the present exemplary embodiment, discharge electrode 41 is disposed on the lower side (lower surface) in the internal space of the housing 40 and protrudes upward. In other words, the longitudinal direction of discharge electrode 41 of the present exemplary embodiment is in the vertical direction.

Discharge electrode 41 includes shaft portion 41*a* and base end portion 41*b*. Shaft portion 41*a* is formed in a rod shape having a circular cross section. Shaft portion 41*a* includes distal end portion 411 described above. Base end portion 41*b* having a flat plate shape is continuously and integrally formed at a first end (an end portion or a lower end opposite to distal end portion 411) of shaft portion 41*a* in the longitudinal direction.

Distal end portion 411 is formed at a second end (an upper end or a distal end) of the shaft portion 41*a* in the longitudinal direction. Distal end portion 411 has a tapered shape in which the cross-sectional area decreases toward the distal end of shaft portion 41*a*. That is, discharge electrode 41 is a needle electrode in which distal end portion 411 is formed in a tapered shape. The “tapered shape” as used herein is not limited to a shape in which the distal end is sharply pointed, and includes a shape in which the distal end is rounded as illustrated in FIG. 2A and FIG. 2B.

The shape of distal end portion 411 of discharge electrode 41 is, for example, a shape including a conical portion. The shape of the portion of distal end portion 411 facing counter electrode 42 (here, the shape of the distal end or the upper end of the conical portion) is, for example, an R shape (round shape). The “R shape” in the present disclosure may include a rounded surface (having roundness) of a certain member. The distal end surface of the distal end portion 411 of the present exemplary embodiment includes a curved surface having a roundness protruding upward. The distal end surface of discharge electrode 41 of the present exemplary embodiment is formed such that a cross-sectional shape including a center axis of discharge electrode 41 has an arc shape continuously connected from the side surface of distal end portion 411, and does not include a corner. That is, the entire distal end surface of discharge electrode 41 is a curved surface (bent surface).

For example, radius of curvature r2 (see FIG. 4C) of the distal end surface of discharge electrode 41 is preferably more than or equal to 0.2 mm. As described above, since distal end portion 411 of discharge electrode 41 has an R shape, excessive concentration of the electric field at distal end portion 411 of discharge electrode 41 can be relaxed as compared with the case where distal end portion 411 of discharge electrode 41 is pointed, and a partial breakdown discharge is easily generated.

(2.4.3) Configuration of Counter Electrode

As illustrated in FIG. 3B, counter electrode 42 is disposed on the upper side (upper surface) in the internal space of housing 40. Counter electrode 42 is disposed so as to face distal end portion 411 of discharge electrode 41 with a gap provided therebetween in the vertical direction. In other words, counter electrode 42 is spatially separated from discharge electrode 41, and counter electrode 42 and discharge electrode 41 are electrically insulated from each other. Counter electrode 42 includes discharge portion 420, support portion 422, recess 421, bottom 4211, and tubular portion 423.

As illustrated in FIG. 3A, recess 421, bottom 4211, and tubular portion 423 are formed in an annular shape centered on distal end portion 411 of discharge electrode 41 in plan view (top view) in which load 4 is viewed from above. That is, recess 421, bottom 4211, and tubular portion 423 are formed in concentric annular shapes in top view of load 4. In top view of load 4, tubular portion 423, bottom 4211, recess 421, and support portion 422 are disposed in this order from the inside around distal end portion 411 of discharge electrode 41.

Support portion 422 is held by housing 40. As illustrated in FIG. 3B, support portion 422 is formed in a flat plate shape having a thickness direction which is in the vertical direction.

Recess 421 is recessed from support portion 422 toward discharge electrode 41. That is, recess 421 is formed so as to be recessed downward from support portion 422. In other words, recess 421 protrudes downward from support portion 422. As illustrated in FIG. 3A, recess 421 has a circular shape in top view of load 4. Recess 421 has a circular tubular shape having a diameter which decreases as it is recessed downward (as it goes downward).

Bottom 4211 protrudes from a lower end of recess 421 toward distal end portion 411 of discharge electrode 41 in top view of load 4. Bottom 4211 is formed in a flat plate shape having a thickness direction which is in the vertical direction and in an annular shape.

As illustrated in FIG. 3B, tubular portion 423 protrudes upward from an inner peripheral end of bottom 4211. That is, tubular portion 423 extends in the protruding direction of discharge electrode 41. Tubular portion 423 of the present exemplary embodiment has a circular tubular shape having a diameter which decreases as it goes upward. In other words, tubular portion 423 protrudes in a direction away from discharge electrode 41, and the outer shape of tubular portion 423 is a truncated cone shape. Tubular portion 423 is formed in a dome shape so as to cover discharge electrode 41 above discharge electrode 41. Tubular portion 423 includes first opening 4231 and second opening 4232.

First opening 4231 and second opening 4232 are arranged in the vertical direction. In other words, first opening 4231 and second opening 4232 are arranged in the protruding direction (upward) of discharge electrode 41. First opening 4231 is disposed below second opening 4232. That is, first opening 4231 is disposed closer to discharge electrode 41 than second opening 4232 is. First opening 4231 and second opening 4232 are circular openings centered on distal end portion 411 of discharge electrode 41 in top view of load 4. As illustrated in FIG. 4B, opening diameter D3 of second opening 4232 of the present exemplary embodiment is smaller than opening diameter D4 of first opening 4231.

As illustrated in FIG. 4A, tubular portion 423 of the present exemplary embodiment further includes edge portion 424. Edge portion 424 is an edge portion of first opening 4231 and is a portion continuous with bottom 4211. Edge portion 424 is a portion including line L2 in which a distance between distal end portion 411 of discharge electrode 41 and counter electrode 42 is minimized. In tubular portion 423, a distance between a portion other than edge portion 424 and distal end portion 411 of discharge electrode 41 is longer than a distance between edge portion 424 and distal end portion 411 of discharge electrode 41. That is, edge portion 424 is a portion where electric field concentration easily occurs. It is sufficient to set a distance between edge portion 424 and distal end portion 411 of discharge electrode 41 and a distance between a portion other than edge portion 424 in tubular portion 423 and distal end portion 411 of discharge electrode 41 such that an electric field concentrates on edge portion 424. Accordingly, edge portion 424 of tubular portion 423 can be used as a discharge portion. Note that line L2 in the present exemplary embodiment is a virtual line. In top view of load 4, line L2 is an annular line centered at distal end portion 411 of discharge electrode 41, and edge portion 424 has an annular shape including line L2. Distance D1 between annular line L2 and distal end portion 411 of discharge electrode 41 is equal over the entire circumference of line L2. Line L2 of the present exemplary embodiment forms a virtual right circular cone which has a length of a generatrix equal to distance D1 and has distal end portion 411 of discharge electrode 41 as an apex. Distance D1 between line L2 and distal end portion 411 of discharge electrode 41 is smaller than distance D2 between the edge of second opening 4232 and distal end portion 411 of discharge electrode 41.

Edge portion 424 of the present exemplary embodiment includes a curved surface. In other words, as illustrated in FIG. 4B, edge portion 424 has a roundness protruding toward distal end portion 411 of discharge electrode 41. More specifically, edge portion 424 is formed in a semicircular arc shape continuously connected from bottom 4211 in a cross section thereof, and does not include a corner. That is, the entire surface of edge portion 424 of tubular portion 423 is a curved surface (bent surface).

Radius of curvature r1 of edge portion 424 is preferably more than or equal to ½ of radius of curvature r2 (see FIG. 4C) of distal end portion 411 of discharge electrode 41. That is, it is preferable to satisfy a relational expression "$r1 \geq r2 \times \frac{1}{2}$". As one example, when radius of curvature r2 of distal end portion 411 of discharge electrode 41 is 0.6 mm, radius of curvature r1 of edge portion 424 is preferably more than or equal to 0.3 mm. The "radius of curvature" as used herein means the minimum value, that is, the radius of curvature of the portion having the maximum curvature for both edge portion 424 and distal end portion 411 of discharge electrode 41. However, because FIG. 4B and FIG. 4C have different scales, "r1" in FIG. 4B and "r2" in FIG. 4C do not immediately represent a ratio of "r1" to "r2".

Radius of curvature r1 of edge portion 424 is more preferably larger than radius of curvature r2 of distal end portion 411 of discharge electrode 41. Radius of curvature r1 of edge portion 424 of the present exemplary embodiment is larger than radius of curvature r2 of distal end portion 411 of discharge electrode 41.

Discharge portion 420 illustrated in FIG. 4A is a portion where a discharge occurs between discharge portion 420 and distal end portion 411 of discharge electrode 41. Discharge portion 420 extends linearly along a circumference centered at distal end portion 411 of discharge electrode 41. Discharge portion 420 of the present exemplary embodiment is formed at edge portion 424. In other words, discharge portion 420 is formed at an edge of first opening 4231.

Discharge portion 420 of the present exemplary embodiment is a portion (strip-shaped surface) including line L2 in which a distance between distal end portion 411 of discharge electrode 41 and counter electrode 42 is minimized. Since discharge portion 420 is a portion including line L2, a discharge is more likely to be generated between discharge portion 420 and distal end portion 411 of discharge electrode 41, and the generation amount of active components can be further increased.

In addition, discharge portion 420 of the present exemplary embodiment is formed in an annular shape along the circumference centered at distal end portion 411 of discharge electrode 41. In other words, discharge portion 420 is formed in an annular shape along the circumference centered at distal end portion 411 of discharge electrode 41 in plan view as viewed from the axial direction of discharge electrode 41. More specifically, discharge portion 420 of the present exemplary embodiment is formed in an annular shape including line L2. A dotted line in FIGS. 4A and 4B indicates discharge path L1 between discharge portion 420 and distal end portion 411 of discharge electrode 41. Discharge path L1 of the present exemplary embodiment is formed along a generatrix of a virtual right circular cone formed by distal end portion 411 of discharge electrode 41 and discharge portion 420. In other words, discharge path L1 is formed along the side surface of the cone formed by distal end portion 411 of discharge electrode 41 and discharge portion 420. In the present disclosure, a discharge generated in a conical side surface shape having an apex at distal end portion 411 of discharge electrode 41 is referred to as a "round discharge". In other words, in the round discharge, a discharge path extending in a conical side surface shape connecting discharge electrode 41 and counter electrode 42 (between the pair of electrodes) is formed.

In addition, since discharge portion 420 of the present exemplary embodiment is formed at edge portion 424, discharge portion 420 is a curved surface. Since discharge portion 420 is a curved surface, it is possible to suppress excessive increase in electric field concentration. By suppressing excessive increase in electric field concentration, it is possible to suppress the development of the discharge mode and the decrease in the generation amount of active components.

Radius of curvature r1 of discharge portion 420 of the present exemplary embodiment is larger than radius of curvature r2 of distal end portion 411 of discharge electrode 41. In other words, radius of curvature r1 of the curved surface of discharge portion 420 is larger than radius of curvature r2 of distal end portion 411 of discharge electrode 41. Radius of curvature r1 of discharge portion 420 is set to be larger than radius of curvature r2 at distal end portion 411 of discharge electrode 41, so that it is possible to further suppress excessive increase in electric field concentration, and it is easy to generate a partial breakdown discharge.

Active components generated around the edge (edge portion 424) of first opening 4231 by the discharge pass through the internal space of tubular portion 423 and are discharged from second opening 4232. That is, tubular portion 423 of the present exemplary embodiment serves as a release path of the active components. Since tubular portion 423 serves as a release path of the active components, the active components can be efficiently released.

Furthermore, opening diameter D3 of second opening 4232 of the present exemplary embodiment is smaller than opening diameter D4 of first opening 4231. Since opening diameter D3 is smaller than opening diameter D4, tubular portion 423 functions as a nozzle that discharges the active components. Therefore, the flow velocity of the active components discharged from second opening 4232 through the internal space of tubular portion 423 increases, and the active components can be discharged more efficiently.

(3) Discharge Mode

Hereinafter, details of a discharge mode generated when applied voltage V1 is applied between discharge electrode 41 and counter electrode 42 will be described with reference to FIGS. 5A to 5C. FIGS. 5A to 5C are conceptual views for describing a discharge mode, and FIGS. 5A to 5C schematically illustrate discharge electrode 41 and counter electrode 42. In electric discharge device 10 according to the present exemplary embodiment, liquid 50 is actually held in discharge electrode 41, and a discharge occurs between liquid 50 and counter electrode 42. However, liquid 50 is not illustrated in FIGS. 5A to 5C. In the following description, it is assumed that there is no liquid 50 in distal end portion 411 of discharge electrode 41. However, in a case where there is liquid 50, "distal end portion 411 of discharge electrode 41" may be replaced with "liquid 50 held in discharge electrode 41" with respect to a place where the discharge is generated or the like.

Here, first, a partial breakdown discharge adopted in discharge device 10 according to the present exemplary embodiment will be described with reference to FIG. 5A. Discharge device 10 initially generates a local corona discharge at distal end portion 411 of discharge electrode 41. In the present exemplary embodiment, discharge electrode 41 is on a negative electrode (ground). Accordingly, the corona discharge generated at distal end portion 411 of discharge electrode 41 is a negative electrode corona. Discharge device 10 further develops the corona discharge generated at distal end portion 411 of discharge electrode 41 to a discharge having higher energy. By the discharge having higher energy, discharge path L1 in which dielectric breakdown partially occurs is formed between discharge electrode 41 and counter electrode 42.

The partial breakdown discharge is an aspect of a leader discharge. That is, the partial breakdown discharge is a discharge which is accompanied by partial dielectric breakdown between the pair of electrodes (discharge electrode 41 and counter electrode 42), but is not a discharge in which dielectric breakdown is continuously generated, but dielectric breakdown is intermittently generated. Therefore, a discharge current generated between the pair of electrodes is also intermittently generated. That is, in a case where a power supply (voltage application circuit 2) does not have a current capacity required to maintain discharge path L1, for example, a voltage applied between the pair of electrodes drops as soon as the corona discharge develops into the partial breakdown discharge, and discharge path L1 is interrupted to stop the discharge. The "current capacity" as used herein is a capacity of a current releasable in a unit time. By repeating such generation and stop of the discharge, a discharge current intermittently flows. As described above, the partial breakdown discharge is different from the spark discharge in which the dielectric breakdown is instantaneously (singly) generated in that a state of high discharge energy and a state of low discharge energy are repeated. The partial breakdown discharge is different from the glow discharge and the arc discharge in which the dielectric breakdown is continuously generated (that is, a discharge current is continuously generated) in that a state of high discharge energy and a state of low discharge energy are repeated.

More specifically, voltage application device 1 applies applied voltage V1 between discharge electrode 41 and counter electrode 42 disposed so as to face each other with a gap provided therebetween to generate a discharge between discharge electrode 41 and counter electrode 42. Moreover, discharge path L1 in which dielectric breakdown partially occurs is formed between discharge electrode 41 and counter electrode 42 at the time of generation of a discharge. Discharge path L1 formed at this time includes first dielectric breakdown region R1 generated around discharge electrode 41, and second dielectric breakdown region R2 generated around counter electrode 42, as illustrated in FIG. 5A.

That is, discharge path L1 in which dielectric breakdown occurs is formed between discharge electrode 41 and counter electrode 42 not entirely but partially (locally). As described above, in the partial breakdown discharge, discharge path L1 formed between discharge electrode 41 and counter electrode 42 is a path in which full path breakdown does not occur, but a path in which dielectric breakdown partially occurs.

As described above, the shape (R shape) of distal end portion 411 of discharge electrode 41 and edge portion 424 of tubular portion 423 are appropriately set so as to appropriately relax the concentration of the electric field, whereby the partial breakdown discharge is easily achieved. That is, the shape of distal end portion 411 and radius of curvature r1 of edge portion 424 are appropriately set so as to appropriately relax the concentration of the electric field together with other factors such as the length of discharge electrode 41 and applied voltage V1, whereby the concentration of the electric field can be moderately relaxed. As a result, when a voltage is applied between discharge electrode 41 and counter electrode 42, full path breakdown such as a full path breakdown discharge does not occur, but only partial dielectric breakdown occurs. As a result, a partial breakdown discharge can be achieved.

Discharge path L1 herein includes first dielectric breakdown region R1 generated around discharge electrode 41, and second dielectric breakdown region R2 generated around counter electrode 42. That is, first dielectric breakdown region R1 is a region in which dielectric breakdown occurs around discharge electrode 41. Second dielectric breakdown region R2 is a region in which dielectric breakdown occurs around counter electrode 42. When liquid 50 is held by discharge electrode 41 and applied voltage V1 is applied between liquid 50 and counter electrode 42, first dielectric breakdown region R1 is generated particularly around liquid 50 in the periphery of discharge electrode 41.

First dielectric breakdown region R1 and second dielectric breakdown region R2 are formed apart from each other so as not to come into contact with each other. In other words, discharge path L1 includes a region (insulation region) in which dielectric breakdown does not occur at least between first dielectric breakdown region R1 and second dielectric breakdown region R2. Accordingly, in the partial breakdown discharge, full path breakdown does not occur in the space between discharge electrode 41 and counter electrode 42, and the discharge current flows through discharge path L1 in a state in which dielectric breakdown partially occurs. In short, even in the case of discharge path L1 in which dielectric breakdown partially occurs, in other words, discharge path L1 including a part in which dielectric breakdown does not occur, the discharge current flows through discharge path L1 between discharge electrode 41 and counter electrode 42, and a discharge is generated.

Second dielectric breakdown region R2 herein is basically generated in counter electrode 42 around a portion where a distance (spatial distance) to discharge electrode 41 is minimized. In the present exemplary embodiment, distance D1 (see FIG. 4A) of counter electrode 42 to discharge electrode 41 is minimized at edge portion 424 (discharge portion 420) formed in a curved surface shape in tubular portion 423, and therefore second dielectric breakdown region R2 is generated around edge portion 424. That is, counter electrode 42 illustrated in FIG. 5A actually corresponds to edge portion 424 of tubular portion 423.

As illustrated in FIG. 4A, discharge portion 420 is a portion including annular line L2 where a distance between distal end portion 411 of discharge electrode 41 and counter electrode 42 is minimized. Therefore, second dielectric breakdown region R2 is generated around annular line L2. Here, the region of discharge portion 420 where second dielectric breakdown region R2 is generated is not limited to a specific region, and is randomly determined around annular line L2.

Meanwhile, in the partial breakdown discharge, as illustrated in FIG. 5A, first dielectric breakdown region R1 around discharge electrode 41 extends from discharge electrode 41 toward counterpart counter electrode 42. Second dielectric breakdown region R2 around counter electrode 42 extends from counter electrode 42 toward counterpart discharge electrode 41. In other words, first dielectric breakdown region R1 and second dielectric breakdown region R2 extend in directions approaching each other from discharge electrode 41 and counter electrode 42, respectively. Therefore, each of first dielectric breakdown region R1 and second dielectric breakdown region R2 has a length along discharge path L1. As described above, in the partial breakdown discharge, the region in which dielectric breakdown partially occurs (each of first dielectric breakdown region R1 and second dielectric breakdown region R2) has a shape extending long in a specific direction.

In the partial breakdown discharge, radicals are generated with higher energy than in the corona discharge (see FIG. 5B), and a large amount of radicals about 2 times to 10 times larger than in the corona discharge is generated. The radicals generated in this manner constitute a basis for not only sterile filtration, odor removal, moisture keeping, freshness keeping, and virus inactivation, but also exerting useful effects in various situations. Here, when radicals are generated by the partial breakdown discharge, ozone is also generated. However, in the partial breakdown discharge, radicals are generated about 2 times to 10 times larger than in the corona discharge, whereas the amount of ozone generated is suppressed to the same level as that in the corona discharge.

Next, a corona discharge will be described with reference to FIG. 5B.

In general, when energy is input between a pair of electrodes to generate a discharge, the discharge mode develops from a corona discharge to a spark discharge, a glow discharge, and an arc discharge depending on the amount of input energy.

The spark discharge, the glow discharge, and the arc discharge are discharges involving dielectric breakdown between the pair of electrodes. The spark discharge is a discharge in which a discharge path is instantaneously (singly) formed. In the glow discharge and the arc discharge, a discharge path formed by dielectric breakdown is maintained while the energy is input between the pair of electrodes, and a discharge current is continuously generated between the pair of electrodes. On the other hand, as illustrated in FIG. 5B, the corona discharge is a discharge locally generated at one electrode (discharge electrode 41), and is a discharge without dielectric breakdown between the pair of electrodes (discharge electrode 41 and counter electrode 42). In short, when applied voltage V1 is applied between discharge electrode 41 and counter electrode 42, a local corona discharge is generated at distal end portion 411 of discharge electrode 41. Here, since discharge electrode 41 is on a negative electrode (ground), the corona discharge generated at distal end portion 411 of discharge electrode 41 is a negative electrode corona. At this time, dielectric breakdown region R3 locally subjected to dielectric breakdown may be generated around distal end portion 411 of discharge electrode 41. Unlike each of first dielectric breakdown region R1 and second dielectric breakdown region R2 in the partial breakdown discharge, dielectric breakdown region R3 does not have a shape extending long in a specific direction. Dielectric breakdown region R3 has a dotted shape (or spherical shape).

Here, if the current capacity is releasable per unit time from the power supply (voltage application circuit 2) to between the pair of electrodes is sufficiently large, the discharge path formed once is maintained without interruption, and as described above, the corona discharge and the spark discharge develop to the glow discharge and the arc discharge.

Next, a full path breakdown discharge will be described with reference to FIG. 5C.

As illustrated in FIG. 5C, the full path breakdown discharge is a discharge mode which intermittently repeats a phenomenon where a corona discharge develops into full path breakdown between the pair of electrodes. That is, in the full path breakdown discharge, a discharge path in which dielectric breakdown occurs as a whole is generated between discharge electrode 41 and counter electrode 42. At this time, dielectric breakdown region R4 in which dielectric breakdown occurs as a whole may be generated between distal end portion 411 of discharge electrode 41 and counter electrode 42 (discharge portion 420). Unlike first dielectric breakdown region R1 and second dielectric breakdown region R2 in the partial breakdown discharge, dielectric breakdown region R4 is not partially generated, but is generated so as to continuously connect distal end portion 411 of discharge electrode 41 and counter electrode 42 to each other.

The full path breakdown discharge is an aspect of a leader discharge. That is, although the full path breakdown discharge is accompanied by dielectric breakdown (total path breakdown) between the pair of electrodes (discharge electrode 41 and counter electrode 42), the dielectric breakdown does not continuously occur, but the full path breakdown discharge is a discharge in which the dielectric breakdown is intermittently generated. Therefore, a discharge current generated between the pair of electrodes (discharge electrode 41 and counter electrode 42) is also intermittently generated. That is, as described above, in a case where the power supply (voltage application circuit 2) does not have a current capacity necessary for maintaining discharge path L1, the voltage applied between the pair of electrodes decreases as soon as the corona discharge develops to the full path breakdown, and discharge path L1 is interrupted to stop the discharge. By repeating such generation and stop of the discharge, a discharge current intermittently flows. As described above, the full path breakdown discharge is different from the spark discharge in which the dielectric breakdown is instantaneously (sporadically) generated in that a state of high discharge energy and a state of low discharge energy are repeated. The full path breakdown discharge is different from the glow discharge and the arc discharge in which the dielectric breakdown is continuously generated (that is, a discharge current is continuously generated) in that a state of high discharge energy and a state of low discharge energy are repeated.

In the full path breakdown discharge, similarly to the partial breakdown discharge, radicals are generated with higher energy than in the corona discharge, and a large amount of radicals about 2 times to 10 times larger than in the corona discharge is generated. However, the energy of the full path breakdown discharge is higher than the energy of the partial breakdown discharge. Therefore, even if a large amount of radicals are generated in accordance with disappearance of ozone and an increase of radicals in a state of a "medium" energy level, the energy level becomes "high" in a subsequent reaction path. In this case, a part of radicals may disappear. In other words, in the full path breakdown discharge, the energy related to the discharge is too high. Accordingly, a part of the generated active components such as radicals (air ions, radicals, charged fine particle liquid containing radicals, and the like) may disappear, leading to a decrease in the generation efficiency of the active components.

In addition, in the partial breakdown discharge (see FIG. 5A) generated by the discharge device 10 of the present exemplary embodiment, the disappearance of radicals due to an excessive energy can be suppressed as compared with the full path breakdown discharge (see FIG. 5C), and a radical generation efficiency can be improved as compared with the full path breakdown discharge. That is, in the full path breakdown discharge, since the energy related to the discharge is too high, a part of the generated radicals may disappear, leading to a decrease in the generation efficiency of the active components. On the other hand, in the partial breakdown discharge, since the energy related to the discharge is suppressed to be small as compared with the full path breakdown discharge, it is possible to reduce the amount of radicals lost due to exposure to the excessive energy, and improve the radical generation efficiency. Consequently, discharge device 10 according to the present exemplary embodiment adopting a partial breakdown discharge can improving a generation efficiency of active components (air ions, radicals, charged fine particle liquid containing these, and the like) as compared with the corona discharge and the full path breakdown discharge.

Further, in the partial breakdown discharge, the concentration of the electric field is relaxed as compared with the full path breakdown discharge. Therefore, in the full path breakdown discharge, a large discharge current momentarily flows between discharge electrode 41 and counter electrode 42 through a discharge path in which full path breakdown occurs, and electric resistance at that time is considerably low. On the other hand, in the partial breakdown discharge, the concentration of the electric field is relaxed, so that the maximum value of the current instantaneously flowing between discharge electrode 41 and counter electrode 42 at the time of forming discharge path L1 in which dielectric breakdown partially occurs is suppressed to be small as compared with the full path breakdown discharge. As a result, in the partial breakdown discharge, generation of nitride oxide (NOx) is suppressed, and an electric noise is further suppressed to be small as compared with the full path breakdown discharge.

A discharge generated by discharge device 10 of the present exemplary embodiment is a round discharge in which discharge path L1 is formed along a side surface portion of a cone formed by distal end portion 411 of discharge electrode 41 and discharge portion 420. Discharge portion 420 is formed into an annular shape, so that discharge portion 420 can have the maximum length along the circumference. Therefore, discharge path L1 between discharge electrode 41 and discharge portion 420 having an apex at distal end portion 411 of discharge electrode 41 is further extended. That is, a space in which a discharge is generated is extended. As discharge path L1 is further extended, the generation amount of active components can be further increased. A discharge generated by discharge device 10 of the present exemplary embodiment is a "round leader discharge" which is a leader discharge and a round discharge. In the round leader discharge, a discharge path extending in a conical side surface shape connecting discharge electrode 41 and counter electrode 42 (between a pair of electrodes) to each other is intermittently formed, and a discharge current (output current) is intermittently and repeatedly generated. The round leader discharge has the advantages of a leader discharge and a round discharge. In the round leader discharge, by extending the discharge path L1 in a conical side surface shape, it is possible to prevent electric field concentration from rapidly growing and developing to a full path breakdown discharge, and to spatially extend a partial breakdown discharge. That is, in the round leader discharge, the generation amount of active components can be further increased as compared with the conventional leader discharge.

(4) Modifications

The above exemplary embodiment is merely one of various exemplary embodiments of the present disclosure. The above exemplary embodiment can be variously changed in accordance with design and the like, as long as the object of the present disclosure can be achieved. Modifications of the above exemplary embodiment will be listed below. The modifications to be described below can be applied in appropriate combination.

(4.1) First Modification

Figure 6A:
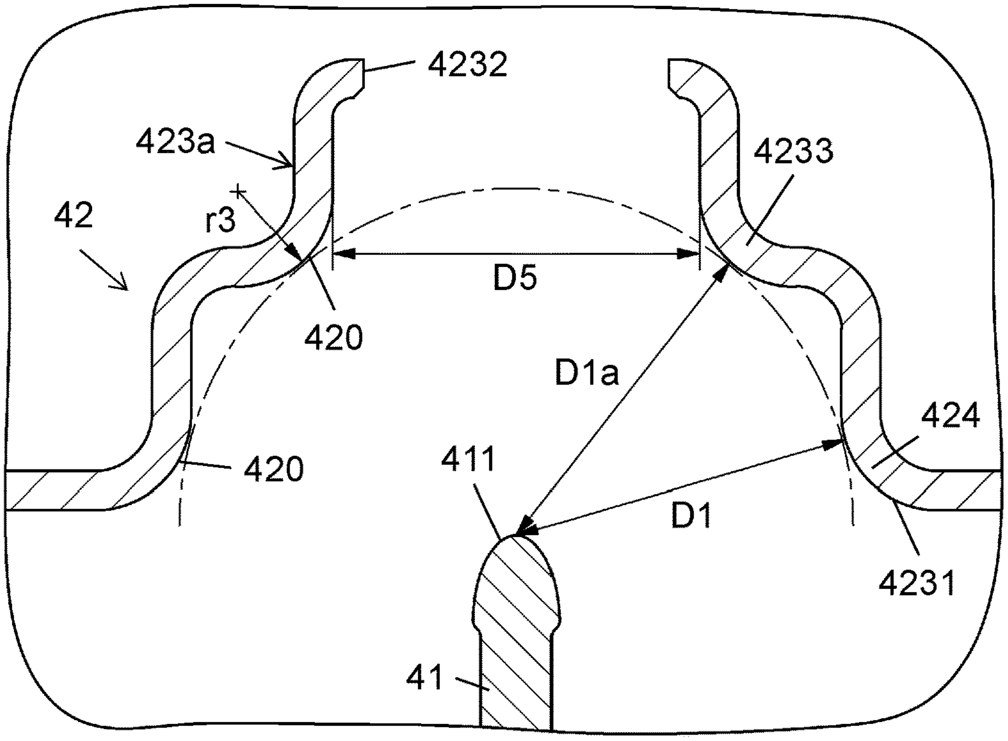
FIG. 6A is a cross-sectional view of a main part of a load in a discharge device according to a first modification.

FIG. 6A is a cross-sectional view of a main part including counter electrode 42 of load 4 in a discharge device according to a first modification. In load 4 of the first modification, as illustrated in FIG. 6A, the shape of counter electrode 42 is different from that of the above exemplary embodiment. In load 4, liquid 50 is actually held by discharge electrode 41, and a discharge occurs between liquid 50 and counter electrode 42. However, liquid 50 is not illustrated in FIG. 6A. In the following description, it is assumed that there is no liquid 50 in distal end portion 411 of discharge electrode 41. However, in a case where there is liquid 50, "distal end portion 411 of discharge electrode 41" may be replaced with "liquid 50 held in discharge electrode 41" with respect to a place where the discharge is generated or the like.

Counter electrode 42 of the first modification includes tubular portion 423*a* instead of tubular portion 423 of the above exemplary embodiment. Tubular portion 423*a* has step 4233. In other words, tubular portion 423*a* has at least one step 4233. Step 4233 is formed between first opening 4231 and second opening 4232 on the inner periphery of tubular portion 423*a*. Step 4233 has an annular shape. More specifically, step 4233 has an annular shape centered on distal end portion 411 of discharge electrode 41 in top view of load 4.

Inner diameter D5 of step 4233 is smaller than opening diameter D4 (see FIG. 4B) of first opening 4231 and larger than opening diameter D3 (see FIG. 4B) of second opening 4232. That is, step 4233 is a portion where inner diameter of tubular portion 423*a* decreases in plan view (bottom view) when load 4 is viewed from below. The inner diameter of tubular portion 423*a* from first opening 4231 to step 4233 is equal to opening diameter D4 of first opening 4231. The inner diameter of tubular portion 423*a* from step 4233 to the lower end of second opening 4232 is equal to inner diameter D5 of step 4233.

Step 4233 of the present modification includes a curved surface. In other words, step 4233 has a roundness protruding toward distal end portion 411 of discharge electrode 41. Radius of curvature r3 of step 4233 is preferably more than or equal to ½ of radius of curvature r2 (see FIG. 4C) of distal end portion 411 of discharge electrode 41. Radius of curvature r3 of step 4233 of the present modification is larger than radius of curvature r2 of distal end portion 411 of discharge electrode 41.

An alternate long and short dash line in FIG. 6A indicates a range in which a distance between distal end portion 411 of discharge electrode 41 and counter electrode 42 is minimized. Distance D1*a* between step 4233 and distal end portion 411 of discharge electrode 41 in the present modification is equal to distance D1 between line L2 (see FIG. 4A) of edge portion 424 and distal end portion 411 of discharge electrode 41. That is, distance D1*a* between step 4233 and distal end portion 411 of discharge electrode 41 is the shortest distance between discharge electrode 41 and counter electrode 42.

Counter electrode 42 of the present modification includes a plurality of (two in the example of FIG. 6A) discharge portions 420. One of two discharge portions 420 is formed at edge portion 424 of first opening 4231 in the same manner as in the above exemplary embodiment. That is, discharge portion 420 formed at edge portion 424 is one of the plurality of discharge portions 420. The other of two discharge portions 420 is formed at step 4233.

Discharge portion 420 formed at step 4233 also generates a round leader discharge similarly to discharge portion 420 formed at edge portion 424. Since counter electrode 42 includes the plurality of discharge portions 420, it is possible to suppress excessive increase in electric field concentration in each discharge portion 420.

As described later in the second modification, tubular portion 423*a* may have two or more (a plurality of) steps. Discharge portion 420 is formed in each of the two or more steps.

(4.2) Second Modification

Figure 6B:
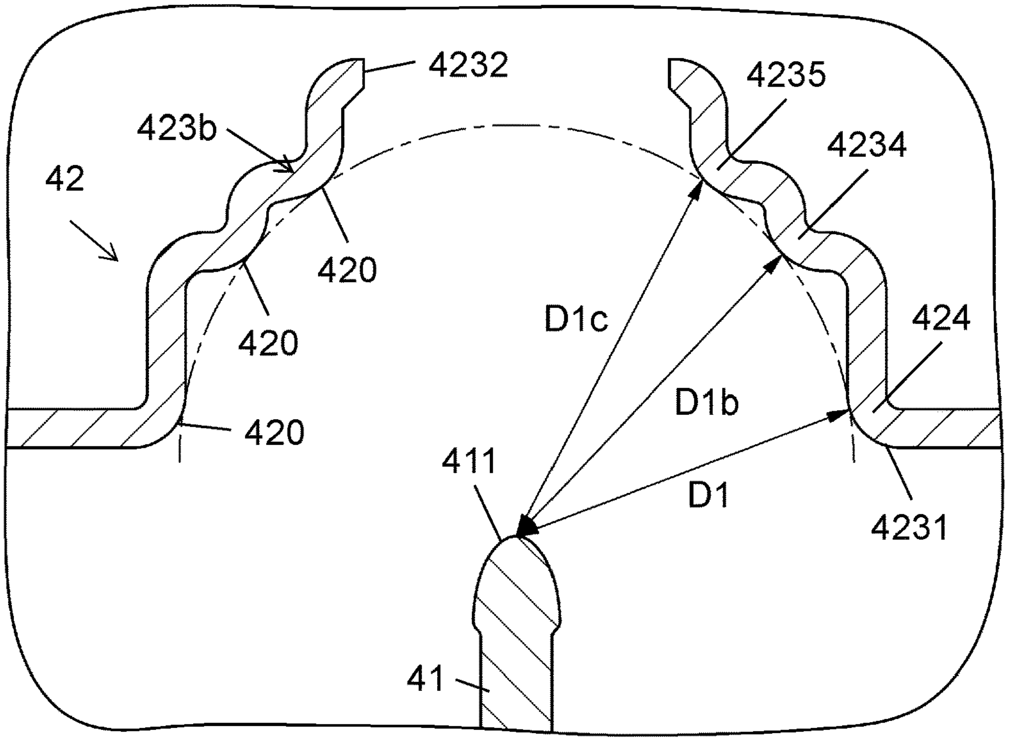
FIG. 6B is a cross-sectional view of a main part of a load in a discharge device according to a second modification.

FIG. 6B is a cross-sectional view of a main part including counter electrode 42 of load 4 in a discharge device according to a second modification. As illustrated in FIG. 6B, counter electrode 42 of the second modification includes tubular portion 423*b* instead of tubular portion 423*a* of the above exemplary embodiment. Tubular portion 423*b* has a plurality of (two in the example of FIG. 6B) steps 4234, 4235. Step 4234 is disposed below step 4235. In other words, step 4234 is disposed at a portion closer to first opening 4231 than step 4235.

Inner diameters of the plurality of steps 4234, 4235 are smaller than opening diameter D4 (see FIG. 4B) of first opening 4231 and larger than opening diameter D3 (see FIG. 4B) of second opening 4232. The inner diameter of step 4234 is larger than the inner diameter of step 4234 disposed on step 4235. That is, in the plurality of steps arranged in the vertical direction, the inner diameter of the step disposed on the lower side is larger than the inner diameter of the step disposed on the upper side. Two steps 4234, 4235 are portions where the inner diameter of tubular portion 423*b* decreases in a bottom view of load 4. The other shapes of two steps 4234, 4235 are similar to those of step 4233 described in the first modification.

An alternate long and short dash line in FIG. 6B indicates a range within which the distance between distal end portion 411 of discharge electrode 41 and counter electrode 42 is minimized. Distance D1*b* between step 4234 and distal end portion 411 of discharge electrode 41 in the present modification is equal to distance D1 between line L2 (see FIG. 4A) of edge portion 424 and distal end portion 411 of discharge electrode 41. Distance D1*c* between step 4235 and distal end portion 411 of discharge electrode 41 in the present modification is equal to distance D1 between line L2 of edge portion 424 and distal end portion 411 of discharge electrode 41. That is, distance D1*b* between step 4234 and distal end portion 411 of discharge electrode 41 and distance D1*c* between step 4235 and distal end portion 411 of discharge electrode 41 are the shortest distances between discharge electrode 41 and counter electrode 42.

Counter electrode 42 of the present modification includes a plurality of (three in the example of FIG. 6B) discharge portions 420. One of three discharge portions 420 is formed at edge portion 424 of first opening 4231 in the same manner as in the above exemplary embodiment. One of three discharge portions 420 is formed at step 4234. One of three discharge portions 420 is formed at step 4235.

Discharge portions 420 formed at two steps 4234, 4235 also generate a round leader discharge similarly to discharge portion 420 formed at edge portion 424. Since counter electrode 42 includes the plurality of discharge portions 420, it is possible to suppress excessive increase in electric field concentration in each discharge portion 420.

Moreover, the shapes of counter electrode 42 and discharge electrode 41 are not limited to the examples of FIGS. 6A and 6B, but may be modified as appropriate. For example, tubular portion 423*b* may have three or more steps. Further, it is not essential that the distance from distal end portion 411 of discharge electrode 41 to the step is the shortest distance (distance D1). The distance from distal end portion 411 of discharge electrode 41 to the step may be appropriately set according to radius of curvature r1 of edge portion 424, the radius of curvature of each of the plurality of steps, and the form of a discharge generated near edge portion 424 and the step.

(4.3) Other Modifications

Liquid supply unit 5 for generating charged fine particle liquid may be eliminated from discharge device 10. In this case, discharge device 10 generates air ions by a partial breakdown discharge generated between discharge electrode 41 and counter electrode 42. In addition to the electrostatic atomization device, discharge device 10 may be an ion generator or the like.

Liquid supply unit 5 is not limited to the configuration in which discharge electrode 41 is cooled to generate dew condensation water on discharge electrode 41 as in the above exemplary embodiment. Liquid supply unit 5 may be configured to supply liquid 50 from a tank to discharge electrode 41 by using a capillary phenomenon or a supply mechanism such as a pump, for example. Moreover, liquid 50 is not limited to water (including dew condensation water), and may be a liquid other than water.

Furthermore, voltage application circuit 2 may be configured to apply a high voltage between discharge electrode 41 and counter electrode 42 while setting discharge electrode 41 as a positive electrode (plus) and counter electrode 42 as a negative electrode (ground). Further, since a potential difference (voltage) only needs to be generated between discharge electrode 41 and counter electrode 42, voltage application circuit 2 may apply a minus voltage to load 4 by setting an electrode on a high potential (positive electrode) to a ground and setting an electrode on a low potential (negative electrode) to a minus potential. That is, in voltage application circuit 2, discharge electrode 41 may be set to the ground, and counter electrode 42 may be set to the minus potential, or discharge electrode 41 may be set to the minus potential, and counter electrode 42 may be set to the ground.

Moreover, voltage application device 1 may include a limiting resistor between voltage application circuit 2 and discharge electrode 41 or counter electrode 42 in load 4. The limiting resistor is a resistor for limiting a peak value of a discharge current flowing after dielectric breakdown in a partial breakdown discharge. For example, the limiting resistor is electrically connected between voltage application circuit 2 and discharge electrode 41, or between voltage application circuit 2 and counter electrode 42.

Voltage application circuit 2 may be a self-excited converter or a separately-excited converter. Voltage generation circuit 22 may also be achieved with a transformer (piezoelectric transformer) having a piezoelectric element.

The mode of discharge adopted by discharge device 10 is not limited to the mode described in the above exemplary embodiment. For example, discharge device 10 may adopt, as one aspect of a round discharge, a discharge in a form in which a phenomenon that a corona discharge develops into dielectric breakdown between a pair of electrodes is intermittently repeated, that is, a "full path breakdown discharge". In this case, in discharge device 10, the following phenomena is repeated. When a corona discharge develops and reaches dielectric breakdown between the pair of electrodes, a relatively large discharge current instantaneously flows, and immediately thereafter, the applied voltage decreases and the discharge current is cut off, and the applied voltage increases and reaches dielectric breakdown.

In addition, each of the leader discharge, the round discharge, and the round leader discharge may be either a partial breakdown discharge or a full path breakdown discharge.

In addition, the discharge device 10 may adopt a spark discharge, an arc discharge, or a glow discharge in which the corona discharge is developed as one form of the round discharge. It is the same as the round leader discharge in that the generation amount of active components generated by the discharge can be increased by extending the discharge path.

Further, the shape of counter electrode 42 is not limited to the shape having irregularities as illustrated in FIG. 3B. That is, counter electrode 42 may not have recess 421, tubular portion 423, and the like. For example, counter electrode 42 may be formed in a flat plate shape having a thickness direction which is in the vertical direction. Counter electrode 42 may include at least discharge portion 420.

The shape of discharge portion 420 is not limited to an annular shape. The shape of discharge portion 420 may extend linearly along the circumference centered at distal end portion 411 of discharge electrode 41. For example, the shape of discharge portion 420 may be an annular shape in which at least a part is missing.

In addition, functions similar to voltage application device 1 according to the above exemplary embodiment may be embodied as a control method of voltage application circuit 2, a computer program, a recording medium in which the computer program is recorded, or the like. That is, the function corresponding to control circuit 3 may be embodied by a control method of voltage application circuit 2, a computer program, a recording medium in which the computer program is recorded, or the like.

Conclusion

As described above, discharge device (10) according to a first aspect includes discharge electrode (41), counter electrode (42), and voltage application device (1). Discharge electrode (41) includes distal end portion (411). Counter electrode (42) is disposed so as to face distal end portion (411) of discharge electrode (41) with a gap provided therebetween. Voltage application device (1) applies a voltage between discharge electrode (41) and counter electrode (42) to generate a discharge between discharge electrode (41) and counter electrode (42). Discharge electrode (41) protrudes (upward) toward counter electrode (42). Counter electrode (42) includes discharge portion (420) where a discharge occurs between discharge portion (420) and distal end portion (411) of discharge electrode (41). Discharge portion (420) extends linearly along a circumference line (L2) centered at distal end portion (411) of discharge electrode (41).

According to this aspect, since discharge portion (420) extends linearly along circumference line (L2) centered at distal end portion (411) of discharge electrode (41), discharge path (L1) having an apex at distal end portion (411) of discharge electrode (41) extends as compared with conventional discharge device (10) including discharge portion (420) formed in a needle shape. As discharge path (L1) extends, it is possible to increase the generation amount of active components (including radicals and the like) generated by the discharge.

In discharge device (10) according to a second aspect, in the first aspect, discharge portion (420) is a portion including line (L2) in which distance (D1) between distal end portion (411) of discharge electrode (41) and counter electrode (42) is minimized.

According to this aspect, since discharge portion (420) is a portion including line (L2) in which distance (D1) from distal end portion (411) of discharge electrode (41) is minimized, a discharge is more likely to be generated between discharge portion (420) and distal end portion (411) of discharge electrode (41), and the generation amount of active components can be further increased.

In discharge device (10) according to a third aspect, in the first or second aspect, discharge portion (420) is formed in an annular shape along the circumference centered at distal end portion (411) of discharge electrode (41).

According to this aspect, discharge portion (420) is formed into an annular shape, so that discharge portion (420) can have the maximum length along the circumference. Therefore, discharge path (L1) having an apex at distal end portion (411) of discharge electrode (41) is further extended. As discharge path (L1) is further extended, the generation amount of active components can be further increased.

In discharge device (10) according to a fourth aspect, in any one of the first to third aspects, discharge portion (420) includes a curved surface.

According to this aspect, excessive increase in electric field concentration can be suppressed by forming discharge portion (420) on the curved surface. By suppressing excessive increase in electric field concentration, it is possible to suppress the development of the discharge mode and the decrease in the generation amount of active components.

In discharge device (10) according to a fifth aspect, in the fourth aspect, radius of curvature (r1) of the curved surface of discharge portion (420) is larger than radius of curvature (r2) of distal end portion (411) of discharge electrode (41).

According to this aspect, radius of curvature (r1) of discharge portion (420) is set to be larger than radius of curvature (r2) at distal end portion (411) of discharge electrode (41), so that it is possible to further suppress excessive increase in electric field concentration.

In discharge device (10) according to a sixth aspect, in any one of the first to fifth aspects, counter electrode (42) further includes tubular portion (423). Tubular portion (423) extends along a direction (upward) in which discharge electrode (41) protrudes. Tubular portion (423) includes first opening (4231) and second opening (4232). First opening (4231) and second opening (4232) are arranged in the protruding direction. First opening (4231) is formed closer to discharge electrode (41) than second opening (4232). Discharge portion (420) is formed at an edge (edge portion 424) of first opening (4231).

According to this aspect, since tubular portion (423) serves as a release path of the active components, the active components can be efficiently released.

In discharge device (10) according to a seventh aspect, in the sixth aspect, tubular portion (423) includes at least one step (4233; 4234; 4235). Step (4233; 4234; 4235) is formed between first opening (4231) and second opening (4232) on an inner periphery of tubular portion (423). Step (4233; 4234; 4235) is formed in an annular shape. Discharge portion (420) is one of a plurality of discharge portions (420). At least one of the plurality of discharge portions (420) is formed in the at least one step (4233; 4234; 4235).

According to this aspect, by including the plurality of discharge portions (420), it is possible to suppress excessive increase in electric field concentration in each discharge portion (420).

In discharge device (10) according to an eighth aspect, in the sixth or seventh aspect, edge (edge portion 424) of first opening (4231) is a portion including line (L2) in which distance (D1) between distal end portion (411) of discharge electrode (41) and counter electrode (42) is minimized. Opening diameter (D3) of second opening (4232) is smaller than opening diameter (D4) of first opening (4231).

According to this aspect, since discharge portion (420) is formed at edge portion (424) including line (L2) in which distance (D1) from distal end portion (411) of discharge electrode (41) is minimized, a discharge is more likely to be generated between distal end portion (411) of discharge electrode (41) and discharge portion (420), and the generation amount of active components can be further increased. In addition, since opening diameter (D3) of second opening (4232) is smaller than opening diameter (D4) of first opening (4231), the active components are more efficiently released from second opening (4232).

In discharge device (10) according to a ninth aspect, in any one of the first to eighth aspects, distal end portion (411) of discharge electrode (41) holds liquid (50). Liquid (50) is electrostatically atomized by the discharge.

According to this aspect, charged fine particle liquid containing radicals is generated. Therefore, the lifetime of the radicals can be prolonged as compared with the case where the radicals are released into the air alone. Moreover, when the charged fine particle liquid has a nanometer size, for example, the charged fine particle liquid can be suspended in a relatively wide range.

Discharge device (10) according to a tenth aspect further includes liquid supply unit (5) in the ninth aspect. Liquid supply unit (5) supplies liquid (50) to discharge electrode (41).

According to this aspect, since liquid (50) is automatically supplied to discharge electrode (41) by liquid supply unit (5), an operation of supplying liquid (50) to discharge electrode (41) can be made unnecessary.

The configurations other than the first aspect are not essential for discharge device (10), and can be omitted as appropriate.

REFERENCE MARKS IN THE DRAWINGS

10 discharge device
41 discharge electrode
411 distal end portion
42 counter electrode
420 discharge portion
423 tubular portion
4231 first opening
4232 second opening
4233, 4234, 4235 step
424 edge portion (edge of first opening)
5 liquid supply unit
50 liquid
D1 distance
D3 opening diameter
D4 opening diameter
L1 discharge path
L2 line
r1 radius of curvature
r2 radius of curvature

The invention claimed is:

1. A discharge device comprising:
a discharge electrode including a distal end portion;
a counter electrode disposed so as to face the distal end portion of the discharge electrode with a gap provided between the counter electrode and the distal end portion; and
a voltage application device that applies a voltage between the discharge electrode and the counter electrode to generate a discharge between the discharge electrode and the counter electrode,
wherein
the discharge electrode protrudes toward the counter electrode,
the counter electrode includes a discharge portion in which the discharge occurs between the discharge portion and the distal end portion of the discharge electrode,
the discharge portion extends along a circumference centered at the distal end portion of the discharge electrode,
the counter electrode further includes a tubular portion extending in a direction in which the discharge electrode protrudes,
the tubular portion includes a first opening and a second opening arranged in a direction in which the discharge electrode protrudes,
the first opening is disposed closer to the discharge electrode than the second opening is, and
the discharge portion is disposed at an edge of the first opening,
the edge of the first opening is a portion including a line in which a distance between the distal end portion of the discharge electrode and the counter electrode is minimized, and
an opening diameter of the second opening is smaller than an opening diameter of the first opening.

2. The discharge device according to claim 1, wherein
the discharge portion is disposed in an annular shape along the circumference centered on the distal end portion of the discharge electrode.

3. The discharge device according to claim 1, wherein
the discharge portion includes a curved surface.

4. The discharge device according to claim 3, wherein
a radius of curvature of the curved surface of the discharge portion is larger than a radius of curvature of the distal end portion of the discharge electrode.

5. The discharge device according to claim 1, wherein
the tubular portion further includes at least one step having an annular shape disposed between the first opening and the second opening on an inner periphery of the tubular portion,
the discharge portion is one of a plurality of discharge portions, and
at least one of the plurality of discharge portions is disposed in the at least one step.

6. The discharge device according to claim 1, wherein
the distal end portion of the discharge electrode holds liquid, and
the liquid is electrostatically atomized by the discharge.

7. The discharge device according to claim 6, further comprising:
a liquid supply unit that supplies the liquid to the discharge electrode.

8. The discharge device according to claim 1, wherein
a discharge path between the distal end portion of the discharge electrode and the discharge portion of the counter electrode is disposed along a generatrix of a virtual right circular cone formed by the distal end portion of the discharge electrode and discharge portion.

9. A discharge device comprising:
a discharge electrode including a distal end portion;
a counter electrode disposed so as to face the distal end portion of the discharge electrode with a gap provided between the counter electrode and the distal end portion; and
a voltage application device that applies a voltage between the discharge electrode and the counter electrode to generate a discharge between the discharge electrode and the counter electrode, wherein the discharge electrode protrudes toward the counter electrode, the counter electrode includes a discharge portion in which the discharge occurs between the discharge portion and the distal end portion of the discharge electrode, the discharge portion extends along a circumference centered at the distal end portion of the discharge electrode, the counter electrode further includes a tubular portion extending in a direction in which the discharge electrode protrudes, the tubular portion includes a first opening and a second opening arranged in a direction in which the discharge electrode protrudes, the first opening is disposed closer to the discharge electrode than the second opening is, the discharge portion is disposed at an edge of the first opening, the tubular portion further includes at least one step having an annular shape disposed between the first opening and the second opening on an inner periphery of the tubular portion, the discharge portion is one of a plurality of discharge portions, and at least one of the plurality of discharge portions is disposed in the at least one step.

* * * * *